No. 743,999. PATENTED NOV. 10, 1903.
J. T. ARMSTRONG & A. ORLING.
SYSTEM OF ELECTRIC COMMUNICATION.
APPLICATION FILED FEB. 5, 1902.
NO MODEL. 2 SHEETS—SHEET 2.
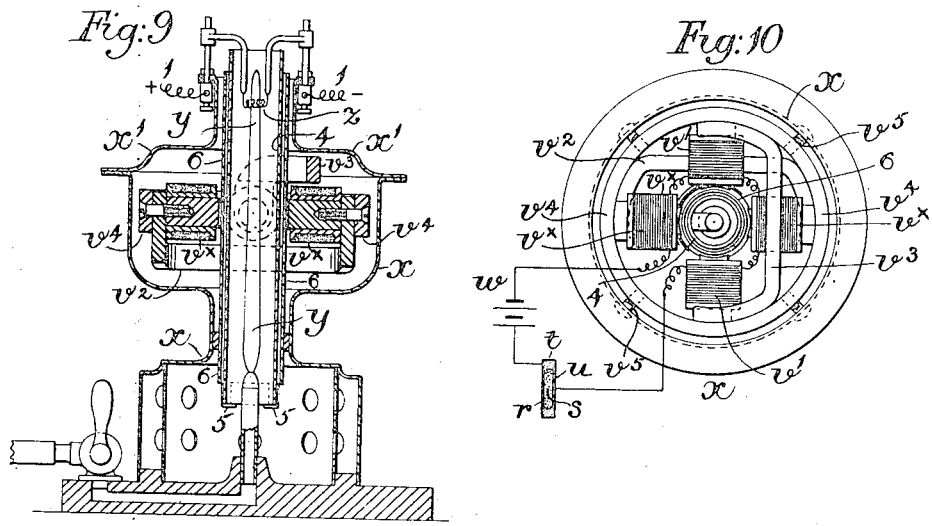
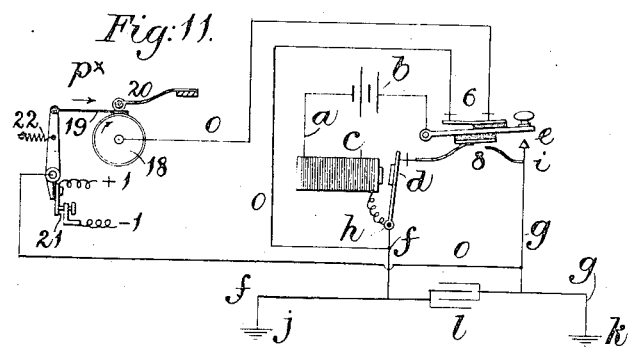
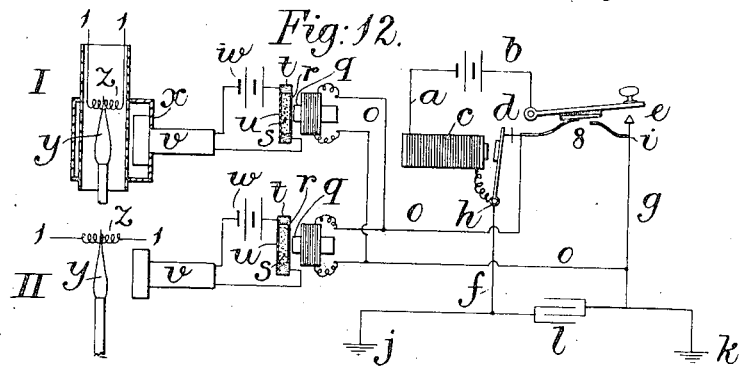
Witnesses:
A. M. Bird
Edgar A. Goddin
Inventors:
Jas. T. Armstrong
Axel Orling No. 743,999.

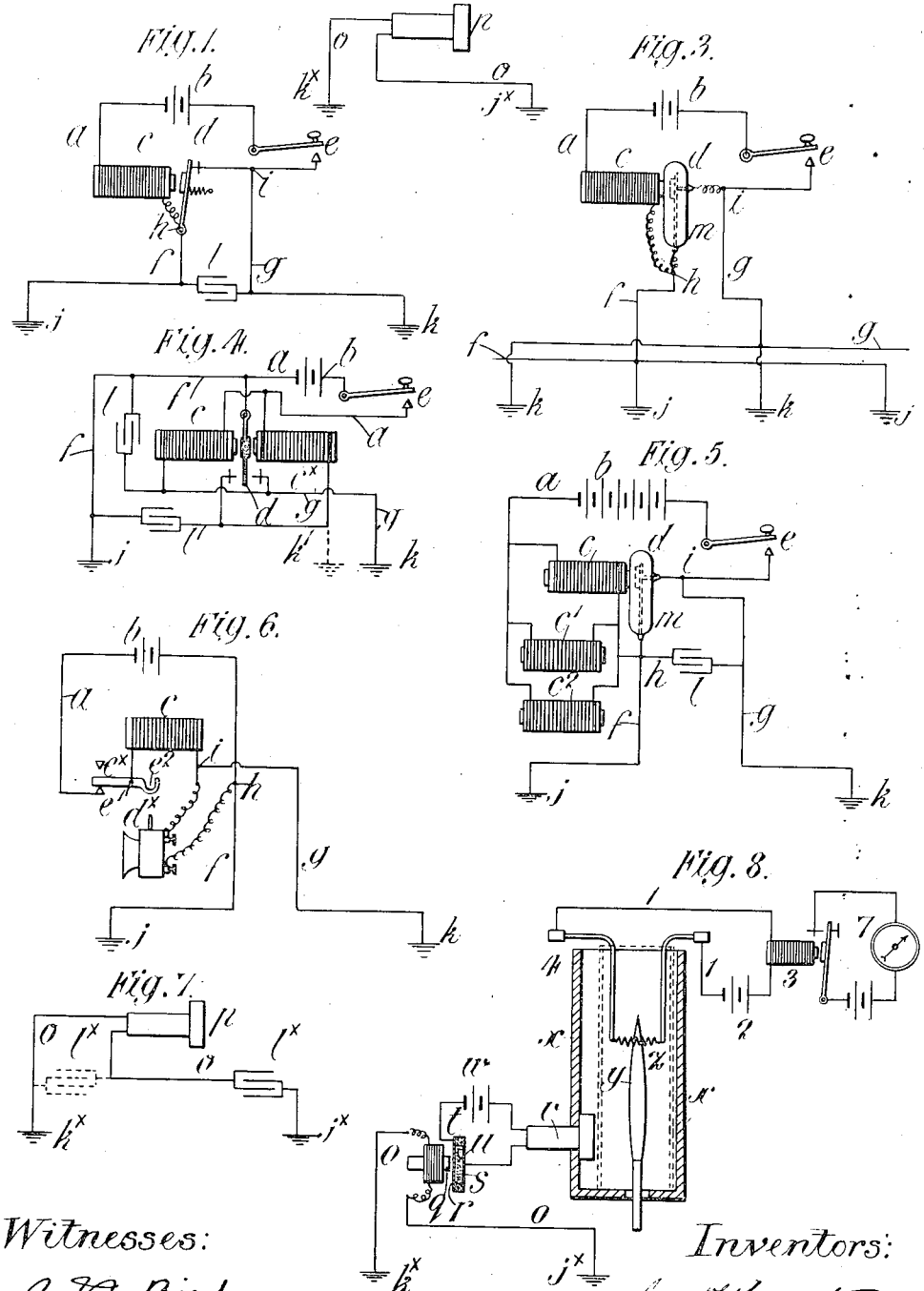

Patented November 10, 1903.

UNITED STATES PATENT OFFICE.

JAMES T. ARMSTRONG AND AXEL ORLING, OF LONDON, ENGLAND.

SYSTEM OF ELECTRIC COMMUNICATION.

SPECIFICATION forming part of Letters Patent No. 743,999, dated November 10, 1903.

Application filed February 5, 1902. Serial No. 92,683. (No model.)

*To all whom it may concern:*

Be it known that we, JAMES TARBOTTON ARMSTRONG, a subject of the King of England, and AXEL ORLING, a subject of the King of Sweden and Norway, both residing at London, England, have invented new and useful Improvements in Systems of Electric Communication, of which the following is a specification.

Our invention relates to means and apparatus for operating or controlling distant apparatus or mechanisms without the employment of wire or other like connection between the controlling-station and the apparatus to be operated or controlled, and has for its object the improvements hereinafter set forth.

In carrying out our invention we provide the transmitting apparatus (hereinafter described) with two or more earth connections, through which are conducted a combination of high-potential discharges and low-tension currents whose circuit or circuits are completed through numerous lines of current-flow which traverse the earth. The transmitted impulses enter the earth by one of the said earth connections and after traversing the same return to complete the circuit through the other. The receiving apparatus (hereinafter described) is also provided with two or more earth connections, which are adapted to cut the said lines of current-flow at points of different potential, causing some of the transmitted energy to flow through them and to actuate the receiver. Preferably the transmitted discharges take place with great rapidity, while the earth connections are also preferably some distance apart.

We will now proceed to more particularly describe our invention, reference being made to the accompanying diagrammatic drawings, in which—

Figures 1 and 2 respectively show the transmitting and receiving apparatus in its simplest form. Figs. 3, 4, and 5 are modified forms of transmitter, and Fig. 6 is a further modification illustrating apparatus employed for the transmission of articulate and musical sounds. Fig. 7 is another form of receiver. Fig. 8 is a receiving apparatus adapted to operate a relay. Fig. 9 is a tuned relay, and Fig. 10 is a partial plan thereof in which the cover and its supported parts are removed. Fig. 11 shows an arrangement of apparatus for transmitting and receiving, and Fig. 12 is a modification thereof hereinafter referred to.

According to the arrangement shown in Fig. 1 we employ an electric circuit $a$, which is provided with battery $b$ or other convenient source of energy, a self-inductance coil $c$, an interrupter $d$, and a telegraph-key $e$, by means of which signals may be transmitted. Suitable connections $f$ and $g$ are made with the circuit $a$ at $h$ and at $i$ on opposite sides of the "make and break," as shown, which are respectively led to earth at $j$ and $k$ in such a manner that the earth will be in circuit at every "break" and in shunt at every "make." Thus at every break the energy of the direct "extra" current will be led to earth with the battery-current, while at every make the earth will receive its share of the inverse extra current and the battery-current.

In order to prevent sparking at the contacts of the interrupter when the circuit is broken and the consequent wasting of the extra current, a condenser $l$ is provided, or the said contacts may be located within an exhausted chamber $m$, (see Fig. 3,) by means of which the resistance of a high vacuum is interposed between them. In some cases we employ both devices, as shown in the arrangement illustrated in Fig. 5, in which a plurality of self-induction coils $c\,c'\,c^2$, arranged in parallel, are employed to increase the energy of the transmitted impulses.

According to the arrangement shown in Fig. 4 the circuit $a$ is divided, and two self-induction coils $c$ and $c^\times$, having a vibrating armature $d$ between them, are employed. By means of this armature the circuit is closed alternately through the branches which energize the two coils $c\,c^\times$, whose fields attract the said armature alternately in opposite directions, and so cause the circuit to be interrupted with great rapidity. In this case three earth connections are employed, $j$ being a common earth, while $k$ and $k'$ serve for the coils $c$ and $c^\times$, respectively. We may, however, sometimes employ a small electromagnet in the place of the second self-induction coil $c^\times$, in which case the earth $k'$ may be dispensed with.

In some cases we "earth" the connections $fg$ at two or more places in such a manner that the positive and negative connections are arranged alternately in line or otherwise, as shown in Fig. 3; but we do not restrict ourselves to any particular form, number, or arrangement of such earth connections.

When the key $e$ is depressed to transmit an impulse, lines of current-flow are propagated which are intercepted in the neighborhood of the receiver by its earth connections $j^\times$ and $k^\times$. These connections, with the receiving part $o$ of the circuit, constitute a species of shunt through which some of the transmitted energy flows.

The receiving apparatus consists of a telephone $p$, an electrocapillary apparatus, an electromotograph, a variable resistance, or any suitable form of galvanoscope by means of which the passage through the receiving-shunt $o$ of the transmitted energy may be detected.

In some cases we employ a condenser $l^\times$, as shown either in full or dotted lines in Fig. 7, to obviate the effect of earth-currents.

When it is desired to transmit articulate sounds, a microphonic or any other suitable transmitter $d^\times$ is employed in the place of the interrupter $d$, as shown in Fig. 6, in which case the switch $e^\times$ is likewise substituted for the telegraph-key $e$. This switch $e^\times$, which is pivoted at $e'$, is provided with a hook $e^2$, upon which the telephonic transmitter $d^\times$ is adapted to hang when not in use, so that its weight may cause the said switch to open the circuit. The impulses that are thus transmitted are received at the distant station by a telephonic receiver $p$, substantially as shown in Figs. 2 or 7.

According to the arrangement shown in Fig. 8 the received impulses, such as might be transmitted by the apparatus shown in Figs. 1, 3, 4, or 5, energize a telephone-magnet $q$, whose varying field vibrates a diaphragm $r$. This diaphragm $r$ bears against carbon granules or the like $u$, contained in an insulating-holder $t$, provided with a metallic or other conducting bottom $s$, from which electrical connection is made with a telephonic receiver $v$, having in circuit with it a local battery $w$, and the first-mentioned diaphragm $r$, whose vibrations by varying the pressure upon the granules cause a fluctuating current of greater strength than the local battery to flow through the telephone $v$, whose diaphragm is vigorously vibrated and considerable sound produced. We may, however, employ any other suitable form of microphonic receiver.

When it is desired to operate a relay, the diaphragm of the telephone $v$ or of two or more similar telephones arranged in circuit is or are located in a chamber $x$, in which is a sensitive flame $y$, whose well-known property is that it is shortened when the air is vibrated, such as is the case when sound is produced. Above the flame is arranged a wire $z$, preferably of platinum, at such a height as to be within the said flame when the latter is of its normal length, but outside it when the said flame is shortened in the manner described. Preferably the wire $z$ is fine, so that it may be rapidly heated and cooled by the behavior of the flame. The wire $z$ forms part of an electric circuit 1, provided with a battery 2, which actuates a relay 3 when the electric resistance of the said wire $z$ is sufficiently lowered by a fall in its temperature, the said relay-circuit being again opened when the flame again heats the wire $z$, whose resistance rises with its temperature, as is well known.

According to the arrangement shown in Figs. 8 and 9 and as indicated by dotted lines in Fig. 8 the sensitive flame $y$ is located within an inner tuned chamber 4 of tubular or other suitable form, which excludes all sound vibrations but those of a definite pitch propagated by itself. Thus a relay so constructed will only be operated by transmitted impulses of a definite pitch. According to this construction the tuned chamber 4 is supported by the depending legs 5 within an outer iron chamber 6, upon which the telephone-magnets $v^\times v'$ act to produce sound. These magnets are of horseshoe pattern and have permanently-magnetized steel cores $v^2 v^3$, upon which the coils are wound reversely, so that when a current is passing in a given direction the field of one of the magnets will be strengthened and the other weakened. The iron chamber 6 is conveniently supported by the outer chamber $x$, in which are located the telephone-magnets $v^\times v'$. These magnets are secured to a ring $v^4$, which is in turn attached to the chamber $x$ by screws $v^5$. The gas-jet is located in the lower part of the chamber $x$, where it is surrounded by double walls, which are provided with perforations so arranged as to insure a uniform supply of air to support combustion. The chamber $x$ is provided with a cover $x'$, which supports on insulation the relay connections 1, to which is attached the variable resistance $z$. By means of one or more relays operated in this or any other well-known or convenient manner it is obvious that telegraphic or other apparatus or mechanisms 7 may be operated or controlled.

In Fig. 11 is shown a combined transmitting and receiving apparatus, in which the former is normally "cut out" and the latter "cut in" in readiness to receive impulses. In this arrangement the receiving-shunt $o$ is earthed at $j$ and $k$ through the same connections $f$ and $g$ as the transmitter. The circuit through the shunt $o$ is normally closed through the switch 6, which is opened when the key $e$ is depressed to transmit an impulse. In the normal position of the key, as shown in the drawings, the transmitting-circuit is broken at 8 as well as at $e$ to prevent the received impulses being short-circuited. When the transmitting-key is depressed, the circuit through the shunt $o$ is first broken at 6 to cut out the receiving instrument, whereafter the transmitting-circuit a is closed at 8 and e. In this arrangement the receiver shown is an electromotograph of well-known construction, consisting of a constantly-driven cylinder 18, having a platinum surface upon which is an outer coating, which may be composed of chalk and potassium hydrate with a small quantity of mercury acetate, which is kept moist. Upon this cylinder 18 bears a strip 19, having a platinum surface, which is pressed against the cylinder by a spring 20. Normally the friction due to the rotation of the cylinder causes the strip to move in the direction of the arrow and break the relay-circuit 1 at 21; but upon the passage of a current this friction is reduced, whereupon the strip 19 is retracted by the spring 22 and the relay-circuit closed.

In the combined transmitting and receiving apparatus shown in Fig. 12 the "tuned" receiver I and the "untuned" receiver II are at all times in circuit except at the break during transmission, when the direct extra current is induced. When, however, the make occurs, they, like the earth, are in shunt with the transmitting-circuit and receive their share of the transmitted impulses. As the receiver I is tuned, it will only be operated by impulses tuned to the same pitch, whereas the untuned receiver II will receive all, including the impulses transmitted from its own station, which it may be adapted to record. When the receiver II is employed to repeat or record the transmitted impulses, it may be tuned by the employment of a chamber 4 of the same pitch as the said impulses to prevent interference between the transmitted and received impulses. In the latter case this receiver would be provided with a set of suitably-tuned chambers.

We are aware that it was known prior to our invention that when a battery-circuit is grounded at two points at a considerable distance apart some of the current may be picked up by "tapping" the earth at two points at a comparatively short distance, and we are also aware that results similar in some respects have been obtained when the secondary circuit of an ordinary induction-coil was similarly completed through the earth; but in none of these cases was it possible to communicate between widely-separated stations except when the earth connections at each station were at prohibitive distances apart. These difficulties we have overcome by the employment of a combination of high-potential discharges and low-tension currents, as hereinbefore described, by means of which lines of current-flow which extend great distances are propagated through the earth between the connections of the transmitter. In this way sufficient of the electric energy to actuate a suitable receiver may be transmitted through very considerable distances while the earth connections are comparatively near to their respective transmitter and receiver.

We therefore wish it to be understood that we do not restrict ourselves to any of the forms of transmitter described, as it is obvious that other forms of apparatus may be employed to produce the desired combination of electrical effects. We also wish it to be understood that the words "earth" and "ground" are used in the general sense and may refer either to land or sea.

What we claim as our invention, and desire to secure by Letters Patent, is—

1. In apparatus for transmitting electric impulses, the combination of conductors constituting an electric circuit with earth connections and means for producing low-tension currents and high-potential discharges together therethrough substantially as set forth.

2. Transmitting apparatus consisting of conductors constituting an electric circuit, earth connections therewith and means for producing low-tension currents and high-potential discharges through the same, in combination with a distant receiver provided with earth connections cutting the lines of current-flow through the earth at points of different potential, permitting some of the transmitted energy to flow through them and actuate the receiver substantially as set forth.

3. A source of electric energy, a self-inductance coil or coils, an interrupter, a circuit-closing key and conductors making circuit through said devices in combination with ground connections from said circuit at points on each side of the said interrupter substantially as set forth.

4. A source of electric energy, a self-inductance coil or coils, an interrupter a circuit-closing key and conductor making circuit through these devices; in combination, with ground connections from said circuit at points on each side of the interrupter and a condenser or equivalent means for preventing sparking at the interrupter substantially as set forth.

5. In transmitting apparatus, the combination of electric conductors constituting a divided circuit with a source of electric energy, a circuit-closing key, a self-inductance coil or coils in each branch of said circuit, a vibrating armature to make and break said circuit alternately through each branch, ground connections from said circuit at points on each side of said circuit making and breaking devices and condensers in shunt thereto, substantially as set forth.

6. In combination with a receiver having two earth connections adapted to cut the lines of transmitted current-flow at points of different potential, transmitting apparatus comprising electric circuit-conductors, a source of electric energy, a self-inductance coil or coils and a key, earth connections from said circuit at two or more points and an interrupter whereby extra currents are induced and discharge into the earth periodically with the battery-current, whereby lines of current-flow are propagated whose presence may be detected by the distant receiver substantially as set forth.

7. In receiving apparatus the combination of a telephone-receiver with means for producing a flame in proximity thereto, a conductor in proximity to said flame and a relay in circuit with said conductor, the said apparatus being provided with two earth connections adapted to cut the lines of transmitting current-flow at points of different potential and the resistance of the said conductor varying with the vibrations of the flame which are caused by the vibrations of the diaphragm substantially as set forth.

8. The receiving apparatus provided with a local circuit including a relay, a sensitive flame arranged in proximity to the said circuit to vary its resistance with the vibration of the flame and means responsive to transmitted electrical impulses, for communicating vibrations to said flame, the said apparatus being provided with two earth connections adapted to cut the lines of transmitting current-flow at points of different potential substantially as set forth.

In testimony whereof we have signed our names to this specification in the presence of two subscribing witnesses.

JAS. T. ARMSTRONG.
AXEL ORLING.

Witnesses:
  A. M. BIRD,
  EDGAR A. GODDIN.